March 10, 1959 — L. C. NEUFELD — 2,876,483

CONTROL DEVICE FOR WINDSHIELD CLEARING SYSTEM

Filed Nov. 16, 1951

Inventor
Leonard C. Neufeld
By (signature)
Attorney

United States Patent Office 2,876,483
Patented Mar. 10, 1959

2,876,483

CONTROL DEVICE FOR WINDSHIELD CLEARING SYSTEM

Leonard C. Neufeld, Des Moines, Iowa, assignor, by mesne assignments, to The Delman Company, Cookeville, Tenn., a corporation of Tennessee Application November 16, 1951, Serial No. 256,690

2 Claims. (Cl. 15—250.4)

This invention relates generally to vehicle windshield clearing systems and in particular to a control device for selectively or concurrently operating the wiper and washing units in said system.

An object of this invention is to provide a common control device for operating the windshield washing and wiper units in a windshield clearing system.

A further object of this invention is to provide a foot actuated control device, common to the washing and wiper units of a windshield clearing system for selectively or concurrently operating said units.

Another object of this invention is to provide a single control device for selectively operating the wiper and washing units in a vehicle windshield clearing system, which is of a simple and compact construction, economical in cost and installation, and capable of being foot operated so as to make unnecessary the removal of a hand from the steering wheel.

A feature of this invention is to provide for use with a windshield clearing system having a foot operated pump unit and a wiper unit including an electric motor, a control switch for said motor mounted on the pump unit having a pivoted actuating member for controlling the operation of the wiper motor on pivotal movement thereof, and for supplying fluid under pressure to the windshield on linear movement thereof.

Further objects, features and advantages of this invention will become apparent from the following description when taken in connection with the accompanying drawing in which.

Figure 1:
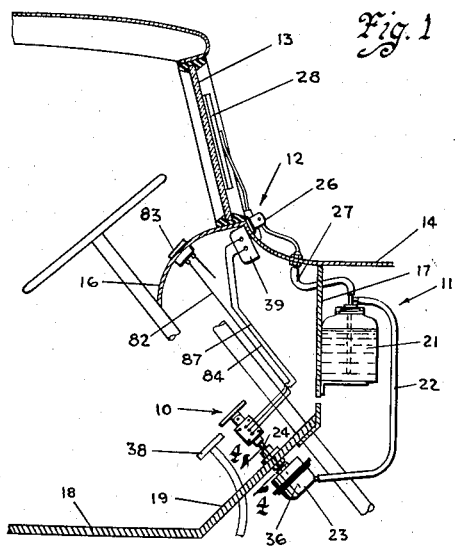
Fig. 1 is a fragmentary longitudinal foreshortened sectional view of a vehicle showing a windshield clearing system embodying the control device of this invention.

With reference to the drawing the control device of this invention, indicated generally at 10, is shown in Fig. 1 in assembly relation with a vehicle windshield washer unit and a vehicle windshield wiper unit designated generally as 11 and 12, respectively. The vehicle is illustrated as having a windshield 13, an engine cowl 14 extended forwardly of the windshield, and an instrument panel or dashboard 16 located rearwardly thereof. The vehicle is further equipped with the usual fire wall 17 and a floor board 18 having an upwardly and forwardly inclined portion 19 which joins with the lower end of the fire wall 17.

The washer unit 11 includes a liquid glass container or reservoir 21 connected through a fluid line 22 with a pump assembly 23, which is mounted on the inclined floor board portion 19 such that the plunger 24 thereof projects upwardly through the floor board. A nozzle 26 mounted on the cowl 14, forwardly of the windshield 13, is connected with the reservior 21 through a fluid line 27 extended through the cowl 14. On depression of the plunger 24, fluid under pressure is supplied to the nozzle 26 for discharge upwardly onto the windshield 13 into the path of movement of a wiper 28 which forms part of the windshield wiping unit 12.

Figure 4:
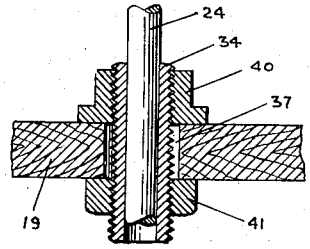
Fig. 4 is an enlarged sectional view as seen on the line 4—4 in Fig. 1.

The plunger 24 (Figs. 1 and 4) of the pump assembly 23 is slidably supported for reciprocal movement within an externally threaded tubular bearing member 34 which projects upwardly from the pump casing 36. In the assembly with a vehicle, the bearing 34 is inserted through an opening 37 formed in the floor board portion 19 so as to extend upwardly from the floor board at a position adjacent to the vehicle clutch pedal 38 as shown in Fig. 1. Clamping nuts 40 and 41 arranged to opposite sides of the floor board portion 19 and threadable on the bearing 34, support the casing 36 in a fixed position from the lower side of the floor board portion 19.

The wiper unit 12 includes an electric motor 39 connected in a usual manner with the wiper 28, to drive or oscillate the wiper.

Figure 2:
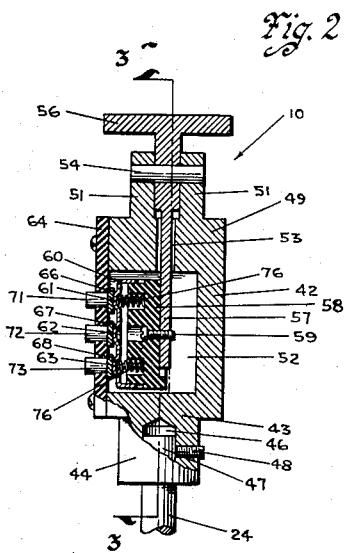
Fig. 2 is an enlarged longitudinal sectional view of the control device of this invention.
Figure 3:
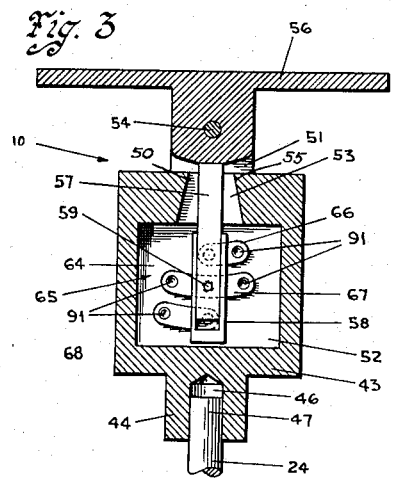
Fig. 3 is a sectional detail view taken on the line 3—3 in Fig. 2.

The control device of this invention is illustrated in Figs. 2 and 3 as including an upright housing or casing 42 integrally formed at its lower end 43 with a boss member 44 having an axial hole 46 drilled in the lower side thereof for receiving the upper end 47 of the pump plunger 24. The plunger 24 is frictionally maintained in assembly relation with the housing 42, in a well known manner, by the provision of a friction screw 48. The upper end 49 of the casing 42 terminates in a pair of upwardly projected transversely spaced ears or lugs 51.

Positioned between the ears 51 is an axially extended hole 53 which opens into the space or compartment 52 within the housing 42. Pivotally supported on a pin 54, carried on the ears 51, is a foot actuated member 56 of a substantially T-shape, the leg or stem 57 of which projects through the hole 53 into the compartment 52. On pivotal movement of the actuating member 56, the stem 57 thereof is pivotally moved within the compartment in a plane extended longitudinally of the plunger 24. As best appears in Fig. 3 the hole 53 is of a shape to accommodate the pivotal movement of the stem 57 within limits defined by the end walls 50 and 55 of the hole 53.

Mounted on the stem 57, and within the compartment 52 (Figs. 2 and 3), is a block 58 formed of an insulating material and secured to the stem by a screw 59. Guidably supported on the block 58 is a yieldable contact member 60 having three contact portions 61, 62 and 63 spaced longitudinally of the stem 57. The casing 42 is provided with a side cover or contact panel 64, for closing the compartment 52, which has on the inner side thereof three elongated arcuate contact members 66, 67 and 68 corresponding to the contact portions 61, 62 and 63, respectively. The outer side of the panel 64 carries three terminals 71, 72 and 73 corresponding to the elongated contact members 61, 62 and 63, respectively.

In assembly the contact member 60 is guidably supported on the block 58 against the action of a pair of coil springs 76, which are positioned within the block and act to yieldably move the contact member 60 toward the contact panel 64. Thus when the panel 64 is secured to the casing 42, the contact portions 61, 62 and 63 are held by the springs 76 in yieldable engagement with the elongated contact members 66, 67, 68, respectively. As best appears in Fig. 3, the contact members 66, 67 and 68 are of varying lengths so as to be selectively engaged with the contact portions 61, 62 and 63 in response to a pivotal movement of the actuating member 56 for a purpose to later appear.

The stem 57 of the actuating member 56 forms part of a control switch, indicated generally as 65, for the motor 39, which switch also includes the contact member 60 and the contact panel 64.

In the operation of the control device of this invention, by pressing downwardly on the actuating member 56, so that it is movable as a unit with the plunger 24, fluid is supplied under pressure to the nozzle 26. This fluid supply to the nozzle 26 takes place at any pivotally moved position of the actuating member 56, so that fluid can be supplied to the windshield 13 when the windshield wiper 28 is in operation or in a stop position. When it is desired to operate only the windshield wiper 28, the actuating member 56 is pivotally moved independently of any movement of the plunger 24.

A pivotal movement of the actuating member 56 thus provides only for a control of the operation of the wiper motor 39, and in turn a movement of the actuating member 56 as a unit with the plunger 24 provides for an operation of the windshield washer unit. By pivotally moving the actuating member 56, concurrently with pressing the same as a unit with the plunger 24, the operation of the windshield washing unit 11 and windshield wiper unit 12 are concurrently controlled.

Figure 5:
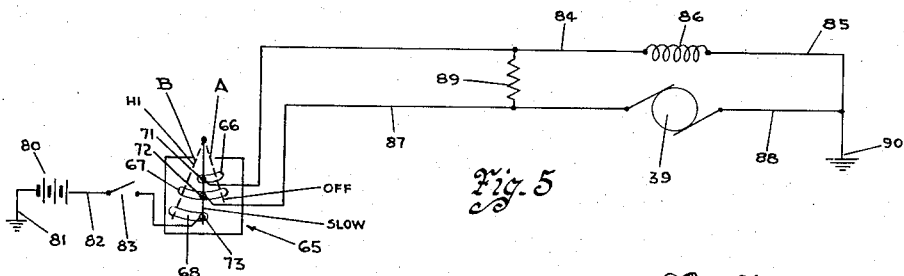
Fig. 5 is a diagrammatic electrical circuit for the control device of this invention.

The electrical circuit for the switch device 65 and the motor 39 is illustrated in Fig. 5 as including a battery 80 having a ground connection 81 from one side thereof. The other side of the battery is connected through a conductor 82 with the terminal 73 for the contact member 68 with an ignition switch 83 for the vehicle being illustrated as connected in series in the conductor 82.

The terminal 71 for the contact member 66 is connected by a conductor 84 with one side of a field winding 86 for the motor 39, with the other side of the field 86 being connected to ground 90 by a conductor 85. The terminal 72 for the contact 67 is connected through a conductor 87 with one side of the motor 39, the opposite side of which is connected to ground 90 through a conductor 88. A resistance 89 is connected in parallel between the conductors 84 and 87.

When the stem 57 is in its position indicated in dotted lines at A in Fig. 5, only the contact members 66 and 67 are engaged by the yieldable contact member 60. This position of the stem member 57 represents the stop position for the motor 39, since it cuts out the battery 80 from the motor circuit.

When the stem 57 is in its full line position indicated in Fig. 5 the circuit for the motor 39 from the battery 80, includes the conductor 82, contact members 66, 67 and 68 whereby the circuit for the motor 39 is closed through the conductors 84 and 87 to the ground 90 so as to include both the field 86 and the resistance 89. This full line position of the stem 57 represents what will be termed a slow operation of the motor 39.

When the motor 39 is to be operated at its full speed, the stem member is moved to its dotted lined position indicated at B in Fig. 5 so that the circuit thereof includes the contact members 67 and 68 so as to eliminate the supply of a full current to the resistance 89 and coil 86.

These motor control positions of the stem 57 are defined by the reception of the contact portions 61, 62, 63 on the yieldable contact member 60 within cavities or depressions 91 (Fig. 3) formed in the contact members 66, 67 and 68, and with the location of the contact portions within these cavities being determined by the feel on the actuating member 56.

It is seen, therefore, that the control device of this invention provides for the foot actuation of the windshield washing unit 11 and wiper unit 12, either selectively or concurrently, and for varying speeds of movement of the wiper 28, by merely pivoting the actuating device 56, or by depressing the actuating member 56 as a unit with the plunger 24, or by concurrently pivoting and depressing the actuating member 56. The hands of the vehicle operator are thus left free at all times for steering purposes, and without necessitating any movement of the vehicle operator from a normal driving position.

Although the invention has been described with respect to a preferred embodiment thereof it is to be understood that it is not to be so limited since changes can be made therein which are within the full intended scope of this invention as defined by the appended claims.

I claim:

1. For use with a vehicle having a windshield wiping unit including a wiper and an electrical motor for operating said wiper, and a windshield washing unit including a nozzle and a pump assembly including a pump plunger for supplying fluid under pressure to said nozzle in which the fluid is supplied to the nozzle in response to a longitudinal movement of the pump plunger, a control device for selectively or concurrently operating said two units including a pivoted actuating member, means pivotally supporting said actuating member on said plunger for pivotal movement relative to said plunger in a plane extended longitudinally of said plunger, a switch assembly including a contact member mounted on said actuating member for movement therewith, a second contact member mounted on said plunger for movement therewith, an electrical circuit operatively connecting said motor and said contact members, with said circuit being opened and closed in response to a pivotal movement of said actuating member, and the movement of said actuating member as a unit with said plunger, providing for the supply of fluid under pressure to said nozzle.

2. For use with a vehicle having a windshield wiping unit including a wiper and an electrical motor for operating said wiper, and a windshield washing unit including a nozzle and a foot operated pump assembly wherein a reciprocally movable plunger has one end projected upwardly through the vehicle floor board to be depressed by foot to supply fluid under pressure to the nozzle, a control device for selectively or concurrently operating said two units including a switch device mounted on the projected end of said plunger and comprising a foot actuated member pivotally supported intermediate its ends for pivotal movement in a plane longitudinally of said plunger, said actuating member having a foot engaging portion at one end thereof and a contact member at the other end thereof, other contact members movable as a unit with said plunger, and an electrical circuit for said motor and contact members, with the pivotal movement of said foot actuating member providing for the opening and closing of said circuit to control the operation of said motor, and the movement of said foot actuated member as a unit with said plunger controlling the supply of fluid under pressure to said nozzle.

References Cited in the file of this patent

UNITED STATES PATENTS

| | | |
|---|---|---|
| 1,910,412 | Staude | May 23, 1933 |
| 2,068,962 | Stanford | Jan. 26, 1937 |
| 2,162,985 | West | June 20, 1939 |
| 2,323,470 | Horton | July 6, 1943 |
| 2,332,122 | Vaughn | Oct. 19, 1943 |
| 2,359,553 | Fuller | Oct. 3, 1944 |
| 2,572,264 | Horton | Oct. 23, 1951 |